Figure 1:
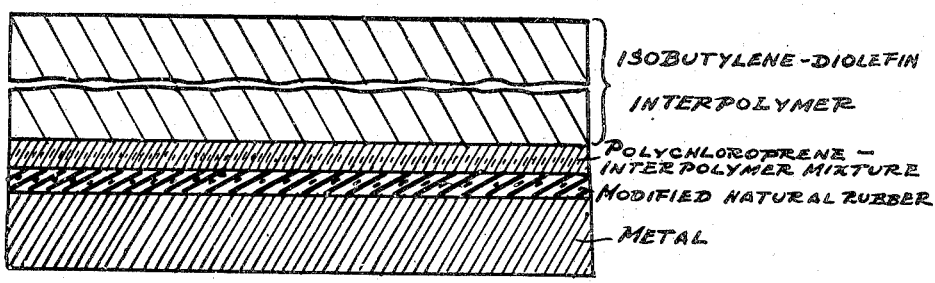

May 31, 1949. W. C. SMITH 2,471,905
ADHESION OF BUTYL RUBBER TO METAL
Filed Feb. 1, 1944

Winthrope C. Smith Inventor
By George J Silhavy Attorney

Patented May 31, 1949

2,471,905

UNITED STATES PATENT OFFICE 2,471,905

ADHESION OF BUTYL RUBBER TO METAL

Winthrope C. Smith, Elizabeth, N. J., assignor to Standard Oil Development Company, a corporation of Delaware Application February 1, 1944, Serial No. 520,712

10 Claims. (Cl. 154—130)

This invention relates to rubber-like structures; relates particularly to rubbery structures utilizing the low temperature interpolymers of isoolefins and diolefins, and relates especially to means for causing the low temperature polymer to adhere to metal surfaces, other rubbery bodies, and the like.

It has been found possible, by a low temperature polymerization reaction, applied to an olefinic mixture containing a major proportion of an isoolefin such as isobutylene with a minor proportion of a diolefin such as butadiene or isoprene, or the like, to produce a highly valuable polymer or copolymer which has some of the physical properties of rubber, and while it is of relatively very low unsaturation, it is sufficiently reactive with sulfur in a curing reaction to yield a material having a tensile strength ranging from 500 to 5000 pounds, elongation at break ranging from 500% to 1200%, high flexure resistance, high abrasion resistance, high resistance to acid, alkali, oxygen, and the like, and other valuable and advantageous properties.

However, this polymer material is wholly non-adhesive to metals and to most of the other solid bodies, and the chemical nature of the polymer material is so greatly different from that of natural rubber and the other synthetic rubber-like substances that great difficulty has been encountered in producing unitary structures composed of metal and adherent polymer, or of polymer adherent to other polymers, resins and rubber-like substances. It may be noted that the polymer cannot be cyclicized, as is done with natural rubber and it does not form sulfonated products nor hydrochloride products as does natural rubber.

It has also been found that various modified forms of natural rubber such as rubber hydrohalide or hydrochloride or cyclicized rubber are strongly adherent to metals, and to natural rubber and most of the other synthetic rubbers. However, the adhesion between the polymer and modified natural rubber such as "Ty Ply S," a rubber hydrohalide, is so low as to be of little or no commercial utility. Furthermore, the polymer cannot be mixed with natural rubber and cured satisfactorily because of the very great difference in reactivity with sulfur between the two substances, the rubber curing first and taking up all of the sulfur and leaving any admixed polymer wholly uncured, or, if the rubber is present in small amount, it causes a very troublesome weakening, blistering effect in the polymer which destroys its utility.

It is now found, however, that polychloroprene, "neoprene," can be mixed with the polymer and that such a mixture can be cured into a high strength substance which is strongly adherent to the tie ply material and is also adherent to the polymer per se, thereby permitting of the construction of a strong unitary structure of polymer and metal. In addition, the mixture of polymer and polychloroprene is strongly adherent to a wide range of other substances including natural rubber, the various synthetic rubbers known as Buna, Buna-N and Buna S, prepared from butadiene alone or mixtures of butadiene with acrylonitrile or styrene, as well as the other synthetic rubber-like substances and many other synthetic resins.

Figure 2:
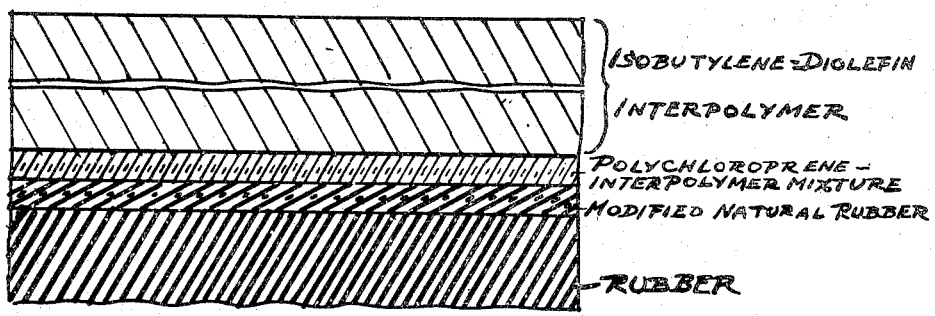

Thus the process of the invention adheres a low temperature isoolefin-diolefin interpolymer to metal or other substances through the intermediary of a modified rubber film and an interposed auxiliary layer containing polychloroprene to yield a strongly adherent, unitary structure. Other objects and details of the invention will be apparent from the following description when read in connection with the accompanying drawing wherein:

Fig. 1 is a sectional view of a rubber and metal structure utilizing a plural interposed adhering layer, and Fig. 2 is a sectional view of a structure utilizing natural rubber and a synthetic polymer with an interposed adhering layer.

The copolymer component of the present invention is a low temperature interpolymer of an isoolefin such as isobutylene or 2-methyl butene-1, or 2-methyl pentane-1, or 2-methyl hexene-1, or the like; with a polyolefin such as butadiene, or isoprene, or piperylene, or dimethyl butadiene, or dimethallyl, or myrcene, or the like, substantially any of the polyolefins having from 4 to 12 or 14 carbon atoms per molecule being useful. This material is cooled to a temperature ranging from −20° C. to −165° C., the preferred temperature range being from −50° C. to −103° C. The cooling may be obtained by the application of a refrigerating jacket to the reactor or by direct admixture of a suitable refrigerant with the olefinic material. For the refrigerating jacket, practically any of the low boiling liquids, under either pressure or suction, may be used to obtain a desired temperature. For the admixed or internal refrigerant, such substances as liquid propane or liquid or solid carbon dioxide or liquid ethane or liquid ethylene or even liquid methane may be used; solid carbon dioxide and liquid ethylene being the preferred internal refrigerants.

The olefinic material may consist of isobutylene in the proportion of from 99.5% to about 10% with the diolefin in the proportion of 0.5% to 80 or 90%; although the preferred ratio utilizes a major proportion of the isoolefin and a minor proportion of the diolefin.

The polymerization is conducted by a dissolved Friedel-Crafts catalyst, aluminum chloride in solution in ethyl or methyl chloride or carbon disulfide being a preferred catalyst. Alternatively, however, practically any of the Friedel-Crafts catalysts disclosed by N. O. Calloway in his article on "The Friedel-Crafts Synthesis," printed in the issue of "Chemical Reviews," published for the American Chemical Society at Baltimore, in 1935, in volume XVII, No. 3, the article beginning on page 327, the list being particularly well shown on page 375, may be used.

These catalysts may be used as such, or may be modified in various ways such as by the formation of alkoxy compounds or chloro hydroxylates or double salts of two halides or of two metals and two halides, and the like. For the solvent, substantially any of the mono or poly halides having less than 5 or 6 carbon atoms per molecule and freezing points below 0° C., thereby being low-freezing, are useful, since all of them are non-complex-forming with respect to the Friedel-Crafts catalyst. Alternatively, carbon disulfide and its analogs and homologs may be used, and with the modified Friedel-Crafts catalyst substances various of the lower hydrocarbons such as liquid ethylene, liquid ethane, liquid propane, liquid butane, pentane, hexane, and the like may be used, since these substances also form no complex with the Friedel-Crafts catalyst and all have freezing points below 0° C.

The catalyst may be applied to the cold olefinic material in any desired manner which obtains a rapid dispersal of the catalyst solution into the olefinic material, a convenient method being the application of the catalyst solution in the form of a fine spray onto the surface of the rapidly stirred olefinic material.

The reaction proceeds quickly to yield a solid polymer, the yield preferably being limited by restriction of the catalyst to from 60 to 85% of the isoolefin and diolefin material present. The solid polymer is then removed from the reaction mixture, brought up to room temperature in any convenient way and purified, as desired, such as by milling on the open roll mill under a stream of water.

The resulting polymer is a solid having a molecular weight ranging between about 25,000 and 250,000 or higher up to about 500,000 (as determined by the Staudinger viscosity method), and an iodine number ranging between about 1 and 40 or 50.

The polymer as so prepared is reactive with sulfur in spite of its low iodine number and it is conveniently compounded with such compounding agents as the various pigments, including carbon black, with zinc oxide, stearic acid, sulfur, and a sulfurization aid such as Tuads (tetramethyl thiuram disulfide). Alternatively, the sulfur and Tuads may be replaced by para quinone dioxime or its esters or by the nitroso compounds such as dinitroso cymene. When so compounded and cured at temperatures ranging from 80° C. to 160° C. for time intervals ranging from a few minutes to several hours, depending upon the curing agent and curing aid, the material shows tensile strengths ranging from 1000 to 5000 pounds per square inch and elongations at break ranging from 500% to 1200%.

The second component of the invention is polychloroprene, which is conveniently obtained commercially under the trade name of "neoprene." This material preferably is an emulsion polymer of chloroprene, $C_4H_5Cl$.

The third component of the invention is a modified natural rubber such as the hydrochloride, obtained by treating natural rubber in solution in such substances as toluene, at low temperatures, with dry hydrogen chloride, or cyclicized rubber such as is obtained by the treatment of natural rubber in solution in benzol with stannic chloride, or the like, or the rubber sulfonates or other analogous compounds.

The unitary structure of the invention then utilizes a solid body which may be a metal in its various forms, or other solid structure which is coated with a film of the tie ply; which in turn is covered with a lamina of polychloroprene, either as such or admixed with the low temperature isoolefin-diolefin interpolymer, and a body of the low temperature interpolymer either as such, or compounded with the various pigments and compounding agents above mentioned. This structure after assembly is then heated to curing temperature for an appropriate length of time to produce the desired integral, cured, unitary structure.

EXAMPLE 1

A steel structure to which it was desired to adhere the polymer was cleaned of oxide, dirt, and the like, by sandblasting and was then coated with a film of the commercial product known as "Ty Ply S." This material is a solution in light naphtha of a rubber hydrohalide together with an appropriate amount of accelerator and an appropriate amount of plasticizer and stabilizer. The film of tie ply was allowed to dry. Simultaneously, test samples were prepared in the form of two, two-inch by six-inch strips of steel which likewise were sand-blasted and coated with the tie ply. The films of tie ply on the members were allowed to dry for approximately 30 minutes. A portion of material for the second layer was then prepared according to the following recipe:

Recipe #1

| | Parts |
|---|---|
| Neoprene GN (polychloroprene) | 100 |
| Phenyl beta naphthyl amine | 2 |
| Light calcined magnesia | 4 |
| Benzothiazyl disulfide | 1 |
| Zinc oxide | 5 |
| Semi-reinforcing furnace black | 100 |

This material was prepared on the open roll mill.

Simultaneously, a compound of the interpolymer was prepared according to the following recipe:

Recipe #2

| | Parts |
|---|---|
| Interpolymer | 100 |
| Zinc oxide | 5 |
| Stearic acid | 3 |
| Sulfur | 1.5 |
| Tetra methyl thiuram disulfide | 1 |
| Semi-reinforcing furnace black | 100 |
| Medium channel black | 50 |

23 parts by weight of the material from Recipe 1 and 23 parts by weight of material from Recipe 2 were dissolved in 300 parts by weight of xylol, and the steel structure and one of the test strips were given two coats of the cement so prepared, each coat being allowed to dry for thirty minutes. A portion of the interpolymer compound as prepared in Recipe 2 was then formed into the desired shape and firmly rolled down onto the steel structure. A second portion was sheeted out on the roll mill and applied to the first of the steel test specimens.

Simultaneously, another portion of compounded interpolymer was prepared according to the following recipe:

Recipe #3

|   | Parts |
|---|---|
| Isobutylene-isoprene interpolymer | 100 |
| Zinc oxide | 5 |
| Stearic acid | 3 |
| Sulfur | 2 |
| Tetramethyl thiuram disulfide | 1 |
| Semi-reinforcing furnace black | 100 |
| Medium channel black | 50 |

This material was prepared on the open roll mill and sheeted out into a convenient thickness and a portion rolled down firmly upon the second test strip without interposition of the neoprene-interpolymer compound mixture.

All three structures were then cured for 30 minutes at a temperature of 311° F. The steel structure was found to have the body of polymer solidly adherent thereto, and to be a sound and satisfactory unitary structure.

To determine the strength of this structure, the first test sample was pulled upon the Scott tester and a strength of 56 pounds per linear inch was found. Thereafter the second test sample, prepared without the interposed neoprene compound-interpolymer compound, was pulled and found to have a strength of only 21 pounds per linear inch. Both samples were tested on the Scott tester by pulling the cured compound away from the metal at a rate of 2 inches per minute.

EXAMPLE 2

An analogous structure was prepared utilizing a natural rubber element as the base member rather than a metal structure. In preparing this structure, the natural rubber was compounded according to the following recipe:

Recipe #4

|   | Parts by weight |
|---|---|
| Smoked sheets | 100 |
| Zinc oxide | 5 |
| Stearic acid | 3 |
| Sulfur | 1.5 |
| Mercaptobenzothiazole | 0.5 |
| Semi-reinforcing furnace black | 75 |

This material was formed into the desired shape; then the surface was buffed and freshened with naphtha to soften it and it was then given a coat of the "Ty Ply S" solution, as in Example 1. The "Ty Ply S" coating was allowed to dry for 30 minutes. Then the coating of "Ty Ply S" was given two coats of the interpolymer solution prepared from Recipe #1 and Recipe #2, as in Example 1, each coat being allowed to dry for 30 minutes. A portion of material compounded according to Recipe #2 was then sheeted out and the sheeted out material was then rolled firmly down onto the third coat. Additional quantities of the material from Recipe #2 were then applied to the surface to prepare the material in the desired shape. The whole assembly was then cured at an appropriate temperature for a proper time, to produce a unitary structure, a portion of which consisted of natural rubber and a further portion of which consisted of the low temperature interpolymer, with a very firm bond between the two. Upon determination of tensile strength, the tensile strength of the composite laminar assembly was found to be nearly equal to the tensile strength of the cured interpolymer, and the assembled structure broke at random at various points in the structure, apparently determined entirely by chance. This example shows the ease with which a strongly adherent unitary structure consisting of laminae of natural rubber and the interpolymer of isobutylene with a diolefin may be prepared.

In the above example, the natural rubber was assembled in uncured condition and the whole structure was cured at once. This, however, is not necessary, since the natural rubber may be separately cured, either fully cured, or given a part cure or set cure, as desired. In the event that the natural rubber is partly or entirely cured, it is desirable that this shall be done with a minimum of accelerator, in order that the final curing of the polymer may not overcure the natural rubber.

EXAMPLE 3

A similar structure to Examples 1 and 2 was prepared, utilizing for the base member a portion of the emulsion interpolymer of butadiene with styrene known commercially as "Buna S." This material was preferably compounded with sulfur, an accelerator, carbon black, zinc oxide and stearic acid in the usual manner, according to the following compounding recipe #5.

Recipe #5

|   | Parts |
|---|---|
| Buna S | 100 |
| Zinc oxide | 5 |
| Stearic acid | 1 |
| Sulfur | 2 |
| Benzothiazyldisulfide | 0.75 |
| Semi-reinforcing furnace black | 75 |

The compounded material, preferably uncured, was then formed into the desired shape, and the desired surface was freshened with naphtha or by buffing, as in Example 2. The freshened surface was then given a coating of the "Ty Ply S," as in Example 1, and the coating was allowed to dry for approximately 30 minutes. Over the Ty Ply coating there were then applied two coatings prepared from Recipes 1 and 2, as in Example 1, each coat also being allowed to dry for approximately 30 minutes. A portion of the low temperature interpolymer of isobutylene with a diolefin, preferably sheeted out on the mill, was then applied over the second coating of mixed cement, and additional portions of the compounded low temperature polymer were then applied over the first portion until a sufficient amount was present. The material was then cured at elevated temperatures for a substantial period of time to yield a similar unitary laminated structure containing both Buna S and the low temperature interpolymer with a strongly adherent bond therebetween.

As in Example 2, the Buna is preferably prepared without curing and the unitary structure is cured as a whole, the amount of curing time and accelerator in the several layers being adjusted so that all are cured to the optimum degree in about the same time. Alternatively, the Buna S may be cured, or may be given a part cure or a set cure, as desired; in these instances a minimum of accelerator being present, in order to avoid overcure.

Thus the isoolefin-diolefin low temperature interpolymer-"Butyl" is readily caused to adhere to metal such as the steel shown in the above example or to brass or bronze or zinc or tin or other metals by the interposed layer of tie ply and the neoprene-containing lamina. The invention is not however limited to structures utilizing metal as a foundation. The interposed laminae of neoprene and "Ty Ply S" are also useful in producing unitary structures of the isoolefin-diolefin polymer with such substances as natural rubber, or the various Bunas, or neoprene itself, or various of the synthetic and natural resins such as Bakelite, the methacrylate resins, shellac, gum damar, copal, and the like, either as such or when filled with pigments or other fillers such as wood flour, ground cork, cotton linters, fabric, and the like. For this purpose various other tie ply substances may be used such as "Vulcalock" which is cyclicized rubber, or "Bostic" which appears to be a rubber sulfonate, or the like, may also be used.

Thus the invention produces a unitary structure, one member of which is a low-temperature interpolymer of an isoolefin with a diolefin which is adherent through the agency of a polychloroprene containing lamina to another solid body.

While there are above disclosed but a limited number of embodiments of the process and product of the invention, it is possible to produce still other embodiments without departing from the inventive concept herein disclosed and it is therefore desired that only such limitations be imposed on the appended claims as are stated therein.

The invention claimed is:
1. In a process for adhering an isoolefin-diolefin interpolymer to a solid body, the improvement which comprises interposing between said interpolymer and the solid body a dual laminae, one thereof comprising polychloroprene mixed with isoolefin-diolefin interpolymer and the other thereof comprising a film of modified rubber adherent to the said solid body and the lamina of polychloroprene-interpolymer mixture.

2. In a process of adhering isoolefin-diolefin interpolymer to metal, the improvement which comprises coating the metal with an adherent film of modified rubber, adhering to said film a layer in which polychloroprene is mixed with isoolefin-diolefin interpolymer, applying to said layer a layer of isoolefin-diolefin interpolymer, and curing the interpolymer in said layers while curing the polychloroprene mixed with the interpolymer in the first-mentioned layer into a unitary mutually adherent.

3. In a process of adhering an isoolefin-diolefin interpolymer to a metal base, the improvement which comprises covering the metal base with a film of halogenated rubber cement, drying said film by evaporating solvent therefrom, coating the dried film of said cement with a solution coating comprising polychloroprene and isoolefin-diolefin interpolymer in a solvent, drying said coating, covering the dried coating with a sheet of isoolefin-diolefin interpolymer, and curing the halogenated rubber, polychloroprene, and the interpolymer in the film coating and sheet respectively with their respective curing agents present therein into a coherent unitary body.

4. In a process for adhering a cured layer of isoolefin-diolefin polymer to a metal base, the improvement which comprises coating the metal base with a layer of halogenated rubber that adheres to the metal base; applying over the layer of halogenated rubber a layer of polychloroprene mixed with isoolefin-diolefin interpolymer; applying over said layer an isoolefin-diolefin polymer; and simultaneously curing the halogenated rubber, the polychloroprene, and the interpolymers in said layers with their respective curing agents into a unitary structure with the metal base.

5. In a process as described in claim 4, said isoolefin-diolefin interpolymer being an interpolymer containing a major proportion of isobutylene and a minor proportion of isoprene.

6. A unitary structure comprising a solid base, a cured film of modified rubber adherent thereto, a lamina comprising a cured mixture of polychloroprene with isoolefin-diolefin interpolymer adherent to said film, and a sheet of cured isoolefin-diolefin interpolymer integrally adherent to the lamina.

7. A unitary structure comprising a metal base, a film of cured halogenated rubber adherent to said base, a lamina comprising a cured mixture of polychloroprene with an isobutylene-isoprene interpolymer adherent to said film, and a layer of cured isobutylene-isoprene interpolymer adherent to said lamina.

8. A unitary structure comprising a natural rubber base, a film of cured halogenated rubber adherent to said base, a lamina comprising a cured mixture of polychloroprene with an isoolefin-diolefin interpolymer adherent to said film, and a cured layer of isoolefin-diolefin interpolymer adherent to said lamina.

9. A unitary structure comprising a synthetic rubber of an interpolymer of butadiene with styrene, a cured film of halogenated rubber adherent thereto, a lamina comprising a cured mixture of polychloroprene with an isoolefin-diolefin interpolymer adherent to said film, and a layer of cured isoolefin-diolefin interpolymer adherent to said lamina.

10. In a unitary structure, a cured mixture of polychloroprene with an isoolefin-diolefin interpolymer integrally laminated to a layer of cured isoolefin-diolefin interpolymer.

WINTHROPE C. SMITH.

REFERENCES CITED

The following references are of record in the file of this patent:

UNITED STATES PATENTS

| Number | Name | Date |
|---|---|---|
| 2,311,308 | Thomas | Feb. 16, 1943 |
| 2,352,637 | Juve | July 4, 1944 |
| 2,366,209 | Morris | Jan. 2, 1945 |

FOREIGN PATENTS

| Number | Country | Date |
|---|---|---|
| 481,396 | Great Britain | Mar. 10, 1938 |

OTHER REFERENCES

Trans. Inst. of the Rubber Ind., vol. 13, p. 158, August 1937.